(12) United States Patent
Oh et al.

(10) Patent No.: US 8,916,489 B2
(45) Date of Patent: Dec. 23, 2014

(54) NON-REDUCIBLE LOW TEMPERATURE SINTERABLE DIELECTRIC CERAMIC COMPOSITION FOR MULTI LAYER CERAMIC CAPACITOR AND MANUFACTURING METHOD THEREOF

(71) Applicant: Samhwa Capacitor Co., Ltd., Yongin-si (KR)

(72) Inventors: Young Joo Oh, Seoul (KR); Jung Rag Yoon, Yongin-si (KR); Byong Chul Woo, Suwon-si (KR)

(73) Assignee: Samhwa Capacitor Co., Ltd. (KR)

( * ) Notice: Subject to any disclaimer, the term of this patent is extended or adjusted under 35 U.S.C. 154(b) by 10 days.

(21) Appl. No.: 13/795,884

(22) Filed: Mar. 12, 2013

(65) Prior Publication Data

US 2013/0244857 A1    Sep. 19, 2013

(30) Foreign Application Priority Data

Mar. 19, 2012    (KR) ........................ 10-2012-0027907

(51) Int. Cl.
| | | |
|---|---|---|
| C04B 35/00 | (2006.01) | |
| C04B 35/468 | (2006.01) | |
| C03C 3/064 | (2006.01) | |
| C04B 35/626 | (2006.01) | |

(52) U.S. Cl.
CPC ....... *C04B 35/468* (2013.01); *C04B 2235/3206* (2013.01); *C04B 35/4682* (2013.01); *C04B 2235/3241* (2013.01); *C04B 2235/3208* (2013.01); *C03C 3/064* (2013.01); *C04B 35/6261* (2013.01); *C04B 2235/3213* (2013.01); *C04B 35/62685* (2013.01); *C04B 2235/5409* (2013.01); *C04B 2235/3236* (2013.01); *C04B 2235/365* (2013.01); *C04B 2235/3249* (2013.01); *C04B 2235/5445* (2013.01); *C04B 2235/3263* (2013.01); *C04B 2235/5454* (2013.01)
USPC ........................... 501/137; 501/138; 501/139

(58) Field of Classification Search
CPC .... C04B 35/46; C04B 35/495; C04B 35/465; C04B 35/4682; C04B 2235/3224
USPC .................. 501/134, 135, 136, 137, 138, 139
See application file for complete search history.

(56) References Cited

U.S. PATENT DOCUMENTS

| | | | | |
|---|---|---|---|---|
| 3,637,532 | A | * | 1/1972 | Ramisch et al. ........... 252/520.1 |
| 4,898,844 | A | * | 2/1990 | Maher et al. .................. 501/138 |
| 6,403,513 | B1 | | 6/2002 | Sato et al. |
| 2011/0183834 | A1 | * | 7/2011 | Tanabe .......................... 501/139 |

FOREIGN PATENT DOCUMENTS

KR    1020000012080    2/2000

* cited by examiner

*Primary Examiner* — Noah Wiese
(74) *Attorney, Agent, or Firm* — Cantor Colburn LLP

(57) ABSTRACT

A dielectric ceramic composition for multilayer ceramic capacitor (MLCC) includes a first component of 91 to 98 wt % and a second component of 2 to 9 wt %, wherein the first component includes a main component $BaTiO_3$ of 94 to 98 wt %, a first subcomponent of 0.5 to 2 wt % including a glass powder having a network structure, and a second subcomponent of 1 to 4 wt % including at least one of MgO, $Cr_2O_3$ and $Mn_3O_4$, and the second component includes $(Ba_{1-y-x}Ca_ySr_x)(Zr_yTi_{1-y})O_3$, and x satisfies $0.2 \leq x \leq 0.8$ and y satisfies $0.03 \leq y \leq 0.15$.

8 Claims, 2 Drawing Sheets

NON-REDUCIBLE LOW TEMPERATURE SINTERABLE DIELECTRIC CERAMIC COMPOSITION FOR MULTI LAYER CERAMIC CAPACITOR AND MANUFACTURING METHOD THEREOF

CROSS-REFERENCE TO RELATED APPLICATION

This application claims the benefit of Korean Patent Application No. 10-2012-0027907, filed on Mar. 19, 2012, in the Korean Intellectual Property Office, the disclosure of which is incorporated herein by reference.

BACKGROUND OF THE INVENTION

1. Field of the Invention

The present invention relates to a non-reducible low temperature sinterable dielectric ceramic composition for a multilayer ceramic capacitor (MLCC) and a manufacturing method thereof, and more particularly, to a non-reducible low temperature sinterable dielectric ceramic composition for an MLCC that may mix a main component and an auxiliary main component having a phase different from the main component, thereby preventing a degradation in reliability that occurs due to a decrease in dielectric thickness according to high capacitance, and a manufacturing method thereof.

2. Description of the Related Art

A multilayer ceramic capacitor (MLCC) is manufactured by molding a dielectric sheet using a dielectric ceramic composition, disposing the dielectric sheet and an internal electrode, and sintering the same in an atmospheric atmosphere. $BaTiO_3$ powder is used as a main material of the dielectric ceramic composition for manufacturing the MLCC.

The $BaTiO_3$ powder is ferroelectrics having a perovskite phase constitution, and is being used as a main material of a non-reducible dielectric ceramic composition of the MLCC due to a high dielectric constant, thermal stability, and low price. A method of manufacturing such $BaTiO_3$ powder includes a hydrothermal method, a solid state reaction method, and the like.

Compared to other manufacturing methods, the hydrothermal method is excellent in manufacturing uniform and ultrafine particles and does not require additional heat treatment and milling processing. However, compared to the solid state reaction method, manufacturing cost is high, a reaction time is long, and it is difficult to adjust a concentration of titanium oxide hydrate. The solid state reaction method is a commercially widely used method, and manufactures $BaTiO_3$ powder by employing, as starting materials, $BaCO_3$ and $TiO_2$, and by performing diffusion control reaction in about 900 to 1400° C. The solid state reaction method has an advantage in that manufacturing cost is low, but has a disadvantage in that a minimum size of manufactured powder is about 0.5 μm and particle distribution is uneven.

Korean Registered Patent No. 327132 (Registered Date: 2002.02.21) relates to a dielectric ceramic composition and an electronic product using $BaTiO_3$ manufactured using the aforementioned method. The dielectric ceramic composition disclosed in Korean Registered Patent No. 327132 is composed using a main component $BaTiO_3$, and $Cr_2O_3$: 0.1 to 3 mol, $V_2O_5$: 0.01 to 0.5 mol, rare earth oxide (R1:Y, Ho, Dy): 0.7 to 7 mol, and MnO: 0.5 mall or less with respect to the main component 100 mol. Rare earth oxide constituting the conventional dielectric ceramic composition prevents the main component $BaTiO_3$ from being degraded due to electron migration that occurs due to an electric field and an ion poor phenomenon. Accordingly, a temperature characteristic or a change in capacitance is small in a direct current (DC) electric field. By increasing a lifespan of insulation resistance, it is possible to enhance long-term reliability of the MLCC.

In the case of manufacturing the conventional dielectric ceramic composition, price of rare earth oxide added as an addition agent for the long-term reliability of the MLCC is currently increasing. Accordingly, manufacturing cost of non-reducible low-temperature sinterable dielectric ceramic composition is also increasing.

SUMMARY OF THE INVENTION

The present invention provides a non-reducible low temperature sinterable dielectric ceramic composition for a multilayer ceramic capacitor (MLCC) that may mix a main component and an auxiliary main component having a phase different from the main component, thereby preventing a degradation in reliability that occurs due to a decrease in dielectric thickness according to high capacitance, and a manufacturing method thereof.

The present invention also provides a non-reducible low temperature sinterable dielectric ceramic composition for an MLCC that may mix a main component and an auxiliary main component having a phase different from the main component, thereby enhancing a temperature characteristic and an insulation resistance characteristic, and a manufacturing method thereof.

The present invention also provides a non-reducible low temperature sinterable dielectric ceramic composition for an MLCC that may mix a main component and an auxiliary main component having a phase different from the main component, thereby preventing a degradation in reliability that occurs due to a decrease in dielectric thickness according to high capacitance and reducing manufacturing cost of the non-reducible low temperature sinterable dielectric ceramic composition, and a manufacturing method thereof.

According to an aspect of the present invention, there is provided a non-reducible dielectric ceramic composition for an MLCC, the dielectric ceramic composition including: a first component of 91 to 98 wt % and a second component of 2 to 9 wt %, wherein the first component includes a main component $BaTiO_3$ of 94 to 98 wt %, a first subcomponent of 0.5 to 2 wt % including a glass powder having a network structure, and a second subcomponent of 1 to 4 wt % including at least one of MgO, $Cr_2O_3$ and $Mn_3O_4$, and the second component includes $(Ba_{1-y-x}Ca_ySr_x)(Zr_yTi_{1-y})O_3$, and x satisfies $0.2 \leq x \leq 0.8$ and y satisfies $0.03 \leq y \leq 0.15$.

According to another aspect of the present invention, there is provided a method of manufacturing a dielectric ceramic composition for an MLCC, the method including: preparing a first component of 91 to 98 wt % and a second component of 2 to 9 wt %; performing deionized water addition of solid loading to be about 25 to 35%, adding an aqueous dispersant of about 1 to 4%, and then performing wet-mixing during about 20 to 30 hours using ball-milling when the first component and the second component are prepared; drying a mixture of the first component and the second component in about 80 to 200° C. when the first component and the second component are mixed; and performing heat treatment during about three to five hours in about 700 to 900° C. when the mixture of the first component and the second component is dried, wherein in the preparing of the first component and the second component, the first component includes a main component $BaTiO_3$ of 94 to 98 wt %, a first subcomponent of 0.5 to 2 wt % including a glass powder having a network structure, and a second subcomponent of 1 to 4 wt % including one of MgO, $Cr_2O_3$ and $Mn_3O_4$, the second component includes $(Ba_{1-y-x}Ca_ySr_x)(Zr_yTi_{1-y})O_3$, and x satisfies $0.2 \leq x \leq 0.8$ and y satisfies $0.03 \leq y \leq 0.15$.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
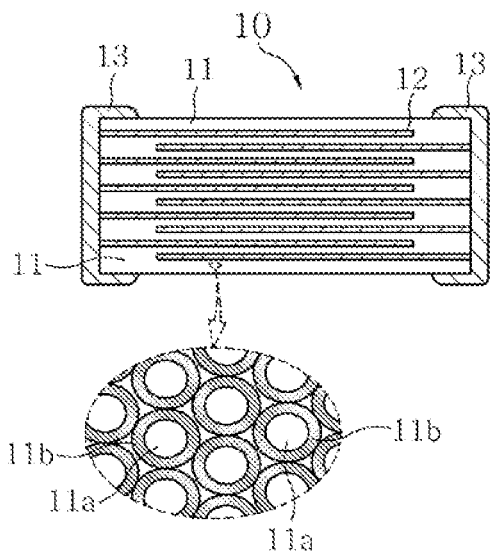
FIG. 1 is a cross-sectional view of a multilayer ceramic capacitor (MLCC) applied with a non-reducible low temperature sinterable dielectric ceramic composition for an MLCC of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a non-reducible low temperature sinterable dielectric ceramic composition for a multilayer ceramic capacitor (MLCC) and a manufacturing method thereof according to an embodiment of the present invention will be described with reference to the accompanying drawings.

As illustrated in FIG. 1, an MLCC 10 of the present invention includes a dielectric element 11, an internal electrode 12, and an external electrode 13.

The dielectric element 11 is manufactured using the non-reducible low temperature sinterable dielectric ceramic composition for the MLCC of the present invention, and the non-reducible low temperature sinterable dielectric ceramic composition includes a first component of 91 to 98 wt % and a second component of 2 to 9 wt %. The first component includes a main component $BaTiO_3$ of 94 to 98 wt %, a first subcomponent of 0.5 to 2 wt % including a glass powder having a network structure, and a second subcomponent of 1 to 4 wt % including at least one of MgO, $Cr_2O_3$ and $Mn_3O_4$. The second component includes $(Ba_{1-y-x}Ca_ySr_x)(Zr_yTi_{1-y})O_3$, and x satisfies $0.2 \leq x \leq 0.8$ and y satisfies $0.03 \leq y \leq 0.15$.

The average particle size of the main component BaTiO of the first component is greater than the average particle size of the second component. For example, the average particle size of the main component $BaTiO_3$ of the first component is about 50 to 150 nm, and a specific surface area thereof is about 4 to 20 m$^2$/g. On the other hand, the average particle size of the second component is about 30 to 100 nm, and a specific surface area thereof is about 3 to 25 m$^2$/g.

The glass powder having the network structure, which is the first subcomponent of the first component, includes aBa-based composition-bSi-based composition-cLi-based composition-dB-based composition-fF-based composition. Here, $a+b+c+d+f=100$ mol % satisfies $3 \leq a \geq 25$ mol %, $20 \leq b \geq 30$ mol %, $5 \leq c \geq 20$ mol %, $30 \leq d \geq 50$ mol %, and $1 \leq f \geq 10$ mol %. Also, in the aBa-based composition-bSi-based composition-cLi-based composition-dB-based composition-fF-based composition, the Ba-based composition uses one of BaO and $BaCO_3$, the Si-based composition uses $SiO_2$, the Li-based composition uses one of $Li_2O$, $Li_2CO_3$, and LiOH, the B-based composition uses one of $B_2O_3$ and $H_3BO_3$, and the F-based composition uses one of $MgF_2$, $CaF_2$, $AlF_3$, and $TiF_4$.

Hereinafter, a method of manufacturing a dielectric ceramic composition for an MLCC of the present invention constructed as above will be described with reference to FIG. 2.

Figure 2:
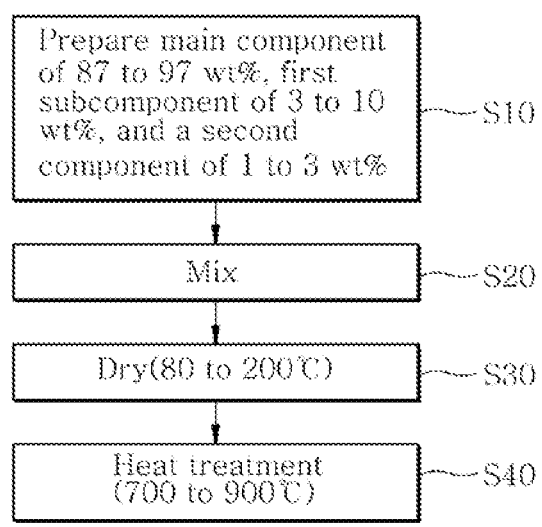
FIG. 2 is a flowchart illustrating a process of manufacturing the non-reducible low temperature sinterable dielectric ceramic composition for MLCC of FIG. 1.

As illustrated in FIG. 2, initially, a first component of 91 to 98 wt % and a second component of 2 to 9 wt % are prepared (S10). Here, the first component is used as a main component and the second component is used as an auxiliary main component having a phase different from the first component.

The first component includes the main component of 94 to 98 wt %, the first subcomponent of 0.5 to 2 wt %, and the second subcomponent of 1 to 4 wt %. In the first component, $BaTiO_3$ is used as the main component and the glass powder having the network structure is used as the first subcomponent. The first subcomponent is used for a sintering agent. A manufacturing method thereof is illustrated in FIG. 3.

Figure 3:
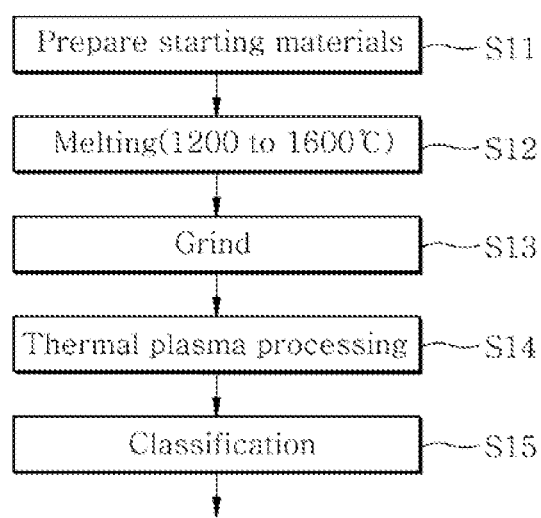
FIG. 3 is a flowchart illustrating a process of manufacturing a glass powder of FIG. 2.

As illustrated in FIG. 3, in the manufacturing method of the first subcomponent, starting materials that are selected from the respective Ba-based, Si-based, Li-based, B-based, and F-based compositions are prepared (S11).

The starting materials include aBa-based composition-bSi-based composition-cLi-based composition-dB-based composition-fF-based composition. Here, the Ba-based composition uses one of BaO and $BaCO_3$, the Si-based composition uses $SiO_2$, the Li-based composition uses one of $Li_2O$, $Li_2CO_3$, and LiOH, the B-based composition uses one of $B_2O_3$ and $H_3BO_3$, and the F-based composition uses one of $MgF_2$, $CaF_2$, $AlF_3$, and $TiF_4$. When the starting materials are prepared, the prepared starting materials are mixed and melted in about 1200 to 1600° C. (S12). When the melting is completed, the glass powder is manufactured by suddenly cooling the mixture and thereby manufacturing glass flake, and by dry-grinding the glass flake (S13).

The grinded glass powder is manufactured as a spherical powder, that is, a crystal nano spherical powder having the average particle size of about 30 to 100 nm through thermal plasma processing (S14). Here, the thermal plasma processing used a radio frequency (RF) plasma torch, and was implemented in an ultra high temperature state of about 3000 to 8000° C. The diameter size of the glass powder injected in the thermal plasma processing is 0.2 to 30 μm. By simultaneously employing spherical structure and vaporization, the nano spherical glass composition having the average particle size of about 30 to 100 nm is manufactured. When the thermal plasma processing is completed, classification of the glass powder is performed (S15). Through this, the final first subcomponent is manufactured.

The second subcomponent is manufactured by employing, as starting materials, $Mg(No_3)26H_2O$, $Cr(NO_3)39H_2O$, and $Mn(NO_3)2H_2O$ with respect to MgO, $Cr_2O_3$ and $Mn_3O_4$, respectively. The manufacturing method may employ a known art and thus, a further detailed description will be omitted here.

The second component is $(Ba_{1-y-x}Ca_ySr_x)(Zr_yTi_{1-y})O_3$ having a phase different from the first component, and is controlled to have the average particle size less than the first main component $BaTiO_3$. That is, a component having the average particle size of 30 to 100 nm and a specific surface area of 3 to 25 m$^2$/g is used as the second component. Using, as starting materials, $BaCO_3$, $CaCO_3$, $SrCO_3$, $CaCO_3$, $ZrO_2$, and $TiO_2$ that may maintain insulation resistance even in a reducible sinterable atmosphere and have a size of about 30 to 100 nm, the second component $(Ba_{1-y-x}Ca_ySr_x)(Zr_yTi_{1-y})O$ is manufactured through wet-mixing, grinding, drying, and thermal processing processes in 950° C. or more during two hours.

When the first component of 91 to 98 wt % and the second component of 2 to 9 wt % are prepared, deionized water addition of solid loading is performed to be about 25 to 35%. After adding an aqueous dispersant of about 1 to 4%, wet-mixing is performed during about 20 to 30 hours using ball-milling (S20). For example, when the first component and the second component are prepared, respectively, deionized water addition of solid loading is performed to become about 30% and an aqueous dispersant of about 1 to 4% is added. Next, wet-mixing of the first component and the second component is performed during about 24 hours using ball-milling.

When the first component (main component+first subcomponent+second subcomponent) and the second component are mixed, the mixture thereof is dried in about 80 to 200° C. (S30). When the mixture of the first component and the second component is dried, heat treatment is performed in about 700 to 900° C. during three to five hours (S40). Through this, the non-reducible dielectric ceramic composition for MLCC of the present invention is manufactured.

The non-reducible dielectric ceramic composition of the present invention manufactured through the aforementioned manufacturing method may manufacture the MLCC 10 of FIG. 1.

As illustrated in FIG. 1, the MLCC 10 includes the dielectric element 11, the internal electrode 120, and the external electrode 13. By manufacturing a dielectric sheet using the non-reducible dielectric ceramic composition of the present invention, the dielectric element 11 may enhance a temperature characteristic or an insulation resistance characteristic. That is, by mixing and thereby using the first component and the second component, it is possible to uniformly form a structure of core-cells 11a, 11b, 11c, and 11d having different phases. Accordingly, an insulation resistance characteristic or a DC bias characteristic may be enhanced. Through this, reliability of the MLCC 10 may also be enhanced.

Instead of using earth rare oxide included in a conventional dielectric ceramic composition, the MLCC 10 uses, for the dielectric element 11, the second component having a phase different from the first component. Accordingly, it is possible to reduce manufacturing cost used for manufacturing the MLCC 10.

As described above, the non-reducible low temperature sinterable dielectric ceramic composition for MLCC of the present invention and the manufacturing method thereof may enhance a temperature characteristic or an insulation resistance characteristic by preventing a degradation in reliability that occurs due to a decrease in dielectric thickness according to high capacitance. Accordingly, it is possible to reduce the manufacturing cost of the non-reducible low temperature sinterable dielectric ceramic composition.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A non-reducible dielectric ceramic composition for a multi-layer ceramic capacitor (MLCC), the dielectric ceramic composition comprising:
a first component of 91 to 98 wt % and a second component of 2 to 9 wt %, wherein the first component comprises a main component $BaTiO_3$ powder of 94 to 98 wt %, a first subcomponent of 0.5 to 2 wt % comprising a glass powder having a network structure, and a second subcomponent of 1 to 4 wt % comprising at least one of $MgO$, $Cr_2O_3$ and $Mn_3O_4$, and the second component comprises $(Ba_{1-y-x}Ca_ySr_x)(Zr_yTi_{1-y})O_3$ powder, and x satisfies $0.2 \leq x \leq 0.8$ and y satisfies $0.03 \leq y \leq 0.15$.

2. The dielectric ceramic composition of claim 1, wherein the average particle size of the main component $BaTiO_3$ powder of the first component is greater than the average particle size of the second component.

3. The dielectric ceramic composition of claim 1, wherein the average particle size of the main component $BaTiO_3$ powder of the first component is about 50 to 150 nm, and a specific surface area thereof is about 4 to 20 $m^2/g$.

4. The dielectric ceramic composition of claim 1, wherein the average particle size of the second component $(Ba_{1-y-x}Ca_ySr_x)(Zr_yTi_{1-y})O_3$ powder is about 30 to 100 nm, and a specific surface area thereof is about 3 to 25 $m^2/g$.

5. The dielectric ceramic composition of claim 1, wherein
the glass powder having the network structure comprises aBa-based composition-bSi-based composition-cLi-based composition-dB-based composition fF-based composition,
a+b+c+d+f=100 mol % satisfies $3 \leq a \geq 25$ mol %, $20 \leq b \geq 30$ mol %, $5 \leq c \geq 20$ mol %, $30 \leq d \geq 50$ mol %, and $1 \leq f \geq 10$ mol %,
the Ba-based composition is one of $BaO$ and $BaCO_3$, the Si-based composition is $SiO_2$, the Li-based composition is one of $Li_2O$, $Li_2CO_3$, and $LiOH$, the B-based composition is one of $B_2O_3$ and $H_3BO_3$, and the F-based composition is one of $MgF_2$, $CaF_2$, $AlF_3$, and $TiF_4$.

6. A method of manufacturing a dielectric ceramic composition for an MLCC, the method comprising:
preparing a first component of 91 to 98 wt % and a second component of 2 to 9 wt %;
performing deionized water addition of solid loading to be about 25 to 35%, adding an aqueous dispersant of about 1 to 4%, and then performing wet-mixing for about 20 to 30 hours using ball-milling when the first component and the second component are prepared;
drying a mixture of the first component and the second component in about 80 to 200° C. when the first component and the second component are mixed; and
performing heat treatment for about three to five hours in about 700 to 900° C. when the mixture of the first component and the second component is dried,
wherein in the preparing of the first component and the second component, the first component comprises a main component $BaTiO_3$ of 94 to 98 wt %, a first subcomponent of 0.5 to 2 wt % comprising a glass powder having a network structure, and a second subcomponent of 1 to 4 wt % comprising one of $MgO$, $Cr_2O_3$ and $Mn_3O_4$, the second component comprises $(Ba_{1-y-x}Ca_ySr_x)(Zr_yTi_{1-y})O$, and x satisfies $0.2 \leq x \leq 0.8$ and y satisfies $0.03 \leq y \leq 0.15$.

7. The method of claim 6, wherein, in the preparing of the first component and the second component, the glass powder is prepared by the step of:
preparing starting materials, wherein the starting materials comprise aBa-based composition-bSi-based composition-cLi-based composition-dB-based composition-fF-based composition, the Ba-based composition is one of $BaO$ and $BaCO_3$, the Si-based composition is $SiO_2$, the Li-based composition is one of $Li_2O$, $Li_2CO_3$, and $LiOH$, the B-based composition is one of $B_2O_3$ and $H_3BO_3$, and the F-based composition is one of $MgF_2$, $CaF_2$, $AlF_3$, and $TiF_4$
mixing the prepared starting materials and then melting the mixed starting materials in about 1200 to 1600° C.;

rapidly cooling the melted starting material to form glass flake, and dry-grinding the glass flake to form grinded glass powder, applying a thermal plasma processing to the grinded glass powder to form spherical glass powder having the average particle size of about 30 to 100 nm; and implementing classification of the spherical glass powder.

8. The method of claim 7, wherein the thermal plasma processing is performed using a radio frequency (RF) plasma torch at a temperature of about 3000 to 8000° C.

\* \* \* \* \*